(12) United States Patent
Hofmann

(10) Patent No.: US 6,229,490 B1
(45) Date of Patent: May 8, 2001

(54) ANTENNA COUPLER FOR TESTING MOBILE TELEPHONES

(75) Inventor: Andreas Hofmann, Oberhaching (DE)

(73) Assignee: Wavetek GmbH, Ismaning (DE)

( * ) Notice: Subject to any disclaimer, the term of this patent is extended or adjusted under 35 U.S.C. 154(b) by 0 days.

(21) Appl. No.: 09/123,731

(22) Filed: Jul. 28, 1998

(30) Foreign Application Priority Data

Jul. 29, 1997 (DE) .............................................. 197 32 639

(51) Int. Cl.[7] ...................................................... H01Q 1/24
(52) U.S. Cl. .......................... 343/702; 343/703; 343/906
(58) Field of Search .................................... 343/702, 703, 343/906, 767, 793, 795; 455/89, 90

(56) References Cited

U.S. PATENT DOCUMENTS 5,668,561 * 9/1997 Perrotta et al. ...................... 343/702
5,777,585 * 7/1998 Tsuda et al. .......................... 343/906

OTHER PUBLICATIONS

Rohde & Schwarz, GSM–G–NoGo–Tester für Handys, Aktuell, Funkschau 8/95, p. 16.

Handy–Test an der Ladentheke, Praxis, Funkschau 18/96, pp. 60–62.

* cited by examiner

Primary Examiner—Tan Ho

(57) ABSTRACT

In an antenna coupler (100) for testing mobile telephones (10), simple structure, which has a low coupling attenuation, is provided in that the antenna coupler (100) has the following features: a printed circuit board (1), on the upper side of which there is formed by a strip transmission line technique at least one antenna element (7,8); and a receiving element for a mobile telephone (10) secured to the upper side of the printed circuit board (1).

19 Claims, 4 Drawing Sheets

ANTENNA COUPLER FOR TESTING MOBILE TELEPHONES

BACKGROUND OF THE INVENTION

The invention relates to an antenna coupling device for testing mobile telephones. An antenna coupler is a component of a test structure for servicing and development of mobile telephones.

When testing mobile telephones or mobiles, a plurality of properties or parameters are investigated, which can be loosely categorized as transmission and reception measurements. In transmission measurements for example, among other things a measurement of the phase error, of the frequency error, of the power and of the spectrum is carried out. In reception measurements bit error rates are measured. With respect to the technical background of tests of radio telephones, reference is made to chapters II and III of the book "GSM-Technik und Meβpraxis" by Siegmund Redl and Mathias Weber, Franzis-Verlag 2, second edition, Poing, 1995 from the series Funkschau Technik.

In order to enable measurement which approximates as closely as possible to practical use of the mobile telephone, the mobile telephone to be tested, (also named test item or DUT—device under test) should transmit and receive HF (=high frequency=radio frequency=RF) power via its antenna. If the transmission properties to the test item are known and sufficiently constant, the power received or transmitted by the test item can be calculated from the measured values. In the measuring method known per se with an antenna on the measuring appliance for coupling with the antenna of the test item, the measurement results are substantially influenced by the following parameters:

(i) space between both antennas; (ii) environment of the antennas (measuring appliances, laboratory installation, walls, people), due to reflections; (iii) interference from irradiating interfering transmitters; and (iv) HF properties of the antenna (radiation characteristics via solid angle and frequency).

Consequently measurements are only possible in large screened chambers, which are lined with HF-absorbent materials. Furthermore, the entire measuring apparatus must be located outside the chamber. In order to use the test item manually the person must enter the chamber and leave it again before measurement can be continued.

Miniature measuring chambers designed as boxes are also known in prior art. In these a basic disadvantage that in order to use the test item the box must be opened and closed again. Moreover, such a box is inconvenient, complex and expensive to manufacture. Transmission of the HF according to prior art is carried out in the interior of the box by a coupling mechanism, which is pushed over the antenna of the test item (model CB Z10 of Rohde and Schwarz), or by a dipole antenna with a coarse x- and y- positioning of the test item (model AH 5911 of ANDO) by mounting the test item on a co-ordinate system. In the first known type of transmission a disadvantage is that this is not suitable for test items with an antenna integrated in the casing or with an antenna too large for the coupling mechanism. In the second type, positioning of the test item is imprecise, as the latter cannot be securely fixed. Finally, in both known types of HF transmission the frequency range of the coupler is restricted to an undesirable degree by the structure, and the coupling attenuation for many test items is so high that the dynamics of the measuring appliance are not sufficient.

OBJECTS OF THE INVENTION

Therefore the object underlying the present invention is to avoid the disadvantages of prior art, and in particular to provide a simply constructed antenna coupler which has a low coupling attenuation for the plurality of commercially available radio telephones.

SUMMARY OF THE INVENTION

The object of the invention is achieved by providing an antenna coupler for testing mobile telephones, wherein the antenna coupler comprises:

a printed circuit board, upon the upper side of which there is formed by strip transmission line technique at least one antenna element; and an accommodating element for a mobile telephone, secured above the printed circuit board.

According to an advantageous embodiment of the invention, the printed circuit has a first and a second antenna element, the first antenna element being provided for a first frequency range and the second antenna element for a second frequency range. The first frequency range is 1710–1900 MHz (DCS 1800 and DCS 1900 system) and the second frequency range is 880–960 MHz (GSM). In this way mobiles of the D1, D2, E and US-network, and further networks operating in this frequency range, can be tested with one antenna coupler.

More advantageously, the upper side of the printed circuit board, particularly its external area, consists of conductive material which is earthed. This provides a certain screening of external fields, without the necessity for a space-consuming box. Furthermore, access to the mobile during testing is ensured in this way.

Preferably, the first antenna element is a dipole antenna and the second antenna element is a slot antenna. In a preferred arrangement the first antenna element is disposed parallel to and substantially beneath the antenna of the mobile telephone on the upper side of the printed circuit board, and the second antenna element is disposed orthogonally to the antenna of the mobile telephone and substantially centrally under the body of the mobile telephone. After a plurality of experimental tests on previously known mobiles it was discovered that the type of antennas and this arrangement for testing in two frequency ranges enables a particularly favorable coupling attenuation.

Both antenna elements are preferably combined via a diplexer to a connection with a test device, so that the antenna coupler can be connected via a single connection to a test device for a plurality of frequency ranges.

According to a preferred embodiment of the invention the diplexer is formed on the underside of the printed circuit board, like the antenna elements in strip transmission line technology, so that an extremely cost-effective and compact structure can be produced.

In a further advantageous embodiment of the invention the underside of the printed circuit board is surrounded by a screening casing, in order to eliminate interfering influences from the environment.

More advantageously, the receiving element for the mobile telephone is a mobile universal holder made of non-metallic material, particularly plastic. Thus the antenna coupler is suitable for all mobile types available on the market, and the test item to be tested is in each case precisely positioned, so that a high repeatability or reproducibility of the measurement values can be achieved. On this basis, software correction methods specific to the mobile telephone can be used, in order to take account of the specific HF transmission properties.

BRIEF DESCRIPTION OF THE DRAWINGS

The invention and further developments and advantages thereof will be explained in the following with reference to an embodiment given by way of example and referring to the drawing, which shows.

DESCRIPTION OF PREFERRED EMBODIMENTS

Figure 1:
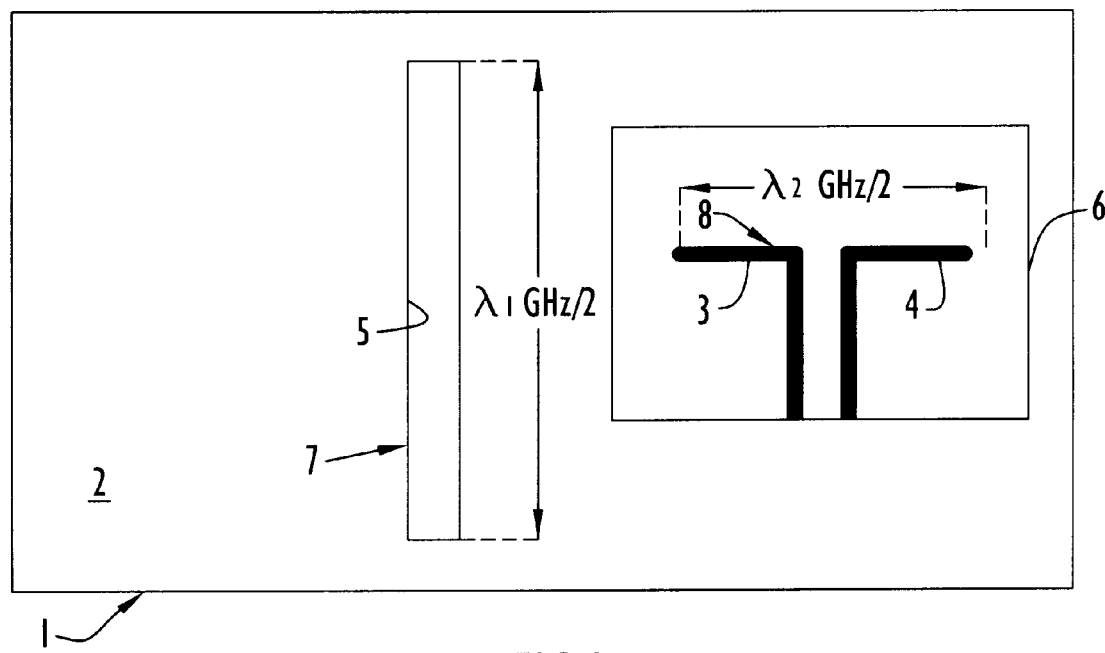
FIG. 1: a schematic view of a printed circuit board of an antenna coupler according to the invention.

FIG. 1 shows a schematic plan view of a rectangular printed circuit board 1 according to the invention. The upper side of the printed circuit board 1 has three printed sections 2,3 and 4. The section 2, which in area covers the main portion of the printed circuit board 1, is earthed (i.e., grounded) and has in its interior two rectangular apertures 5,6. The aperture 5 forms a slot antenna 7 by a strip transmission line technique for a frequency range of 880 to 960 MHz (GSM-system=Global System for Mobile Communications), corresponding to the frequency range of the D1 and D2 networks. The slot antenna 7 is disposed roughly centrally to the printed circuit board 1 and parallel to the narrow sides of the printed circuit board 1. The sections 3 and 4 are disposed inside the aperture 6. By means of the sections 3,4, a dipole antenna 8 is formed by a strip transmission line technique for a further frequency range of 1710 to 1990 MHz (DCS 1800 and DCS 1900 system, corresponding to the E network, or the network used in USA) parallel to the longitudinal side of the printed circuit board 1. Due to the frequency ranges, the length of the slot antenna 7 is roughly twice as great as that of the dipole antenna 8, see also the dimensions indicated in the drawing.

Figure 2:
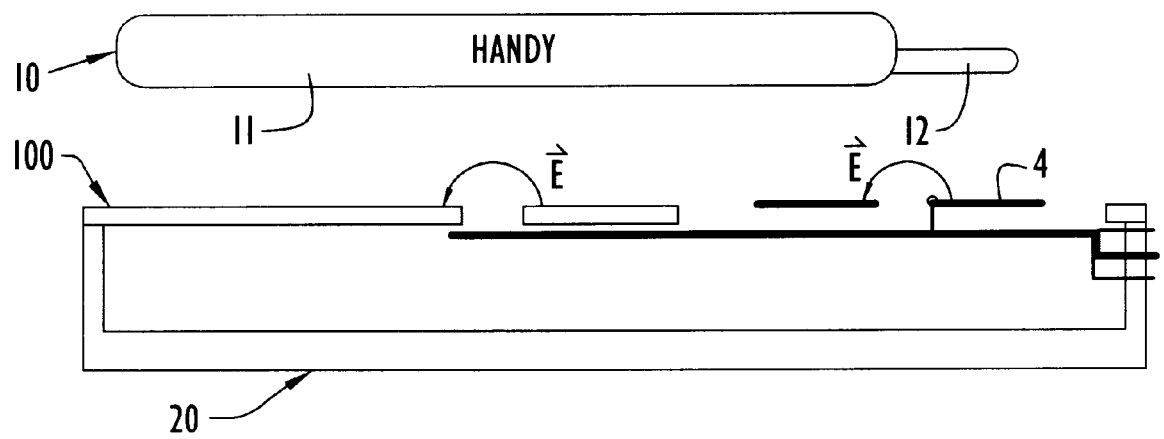
FIG. 2: a schematic view of the disposition of a mobile telephone test item above the printed circuit board of FIG. 1.

FIG. 2 shows a schematic longitudinal sectional view of the printed circuit board 1. Also visible from FIG. 2 is the positioning of a mobile telephone 10 in the longitudinal direction above the printed circuit board 1. The mobile telephone 10 has a body 11 and an antenna 12. The antenna 12 of the mobile telephone 10 in this case lies roughly above the outer section 4 of the dipole antenna 8. A plastic holder (not shown), which is attached to the upper side of the printed circuit board 1, accommodates the mobile telephone 10 at a height of about 2 cm above the printed circuit board 1. The precise position of the mobile telephone 10 in the x,y and z directions relative to the printed circuit board 1 is not precisely pre-established due to the different sizes of mobiles available on the market and the different types of antenna (e.g. antenna integrated in the body, helical antenna, extensible antenna, etc.) Therefore a "middle" positioning of the mobile telephone 10 is shown. It is an advantage of the present invention that with the predetermined antenna (types) 7,8 the positioning of the mobile telephone despite these tolerances gives the coupling attenuation for all commercially available mobiles beneath 20 dB. This could only be discovered by extensive tests on all mobiles available on the market. The specific HF properties between the antenna coupler and a test item, which are type-specific with a predetermined positioning of the mobile holder, are taken into account by software correction methods. Provided beneath the printed circuit board 1 is a screened housing 20, which is conductively connected with the section 2 on the upper side of the printed circuit board 1. Further, FIG. 2 shows schematically the curvature of the field lines of the E field of the driver antennas 7,8. A reference number 100 indicates the entire antenna coupler, which in addition comprises also the mobile holder which is not shown.

Figure 3:
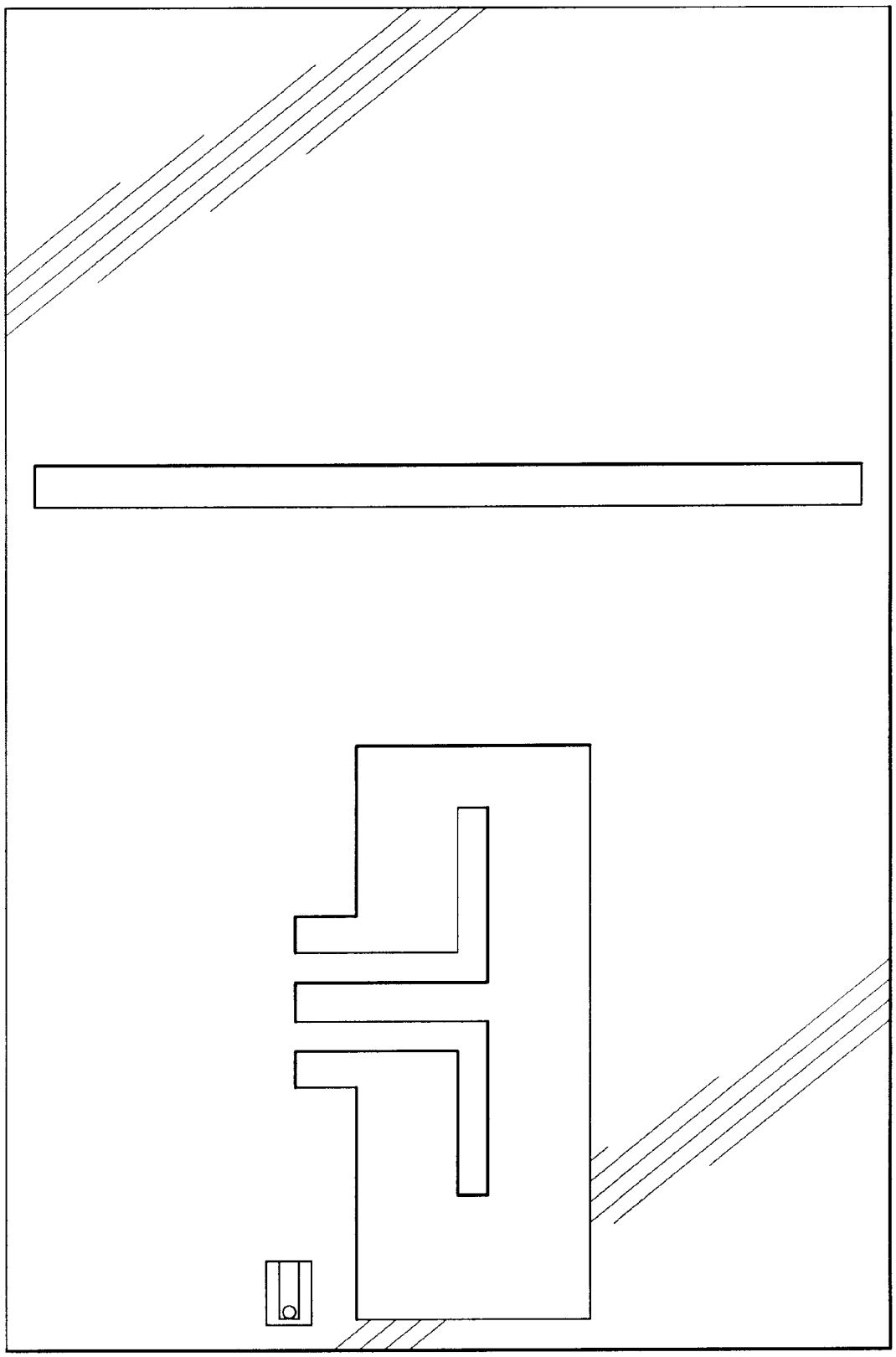
FIG. 3: a view of the upper side of the printed circuit board of FIG. 1 in a reduced-scale view (about 70%)
Figure 4:
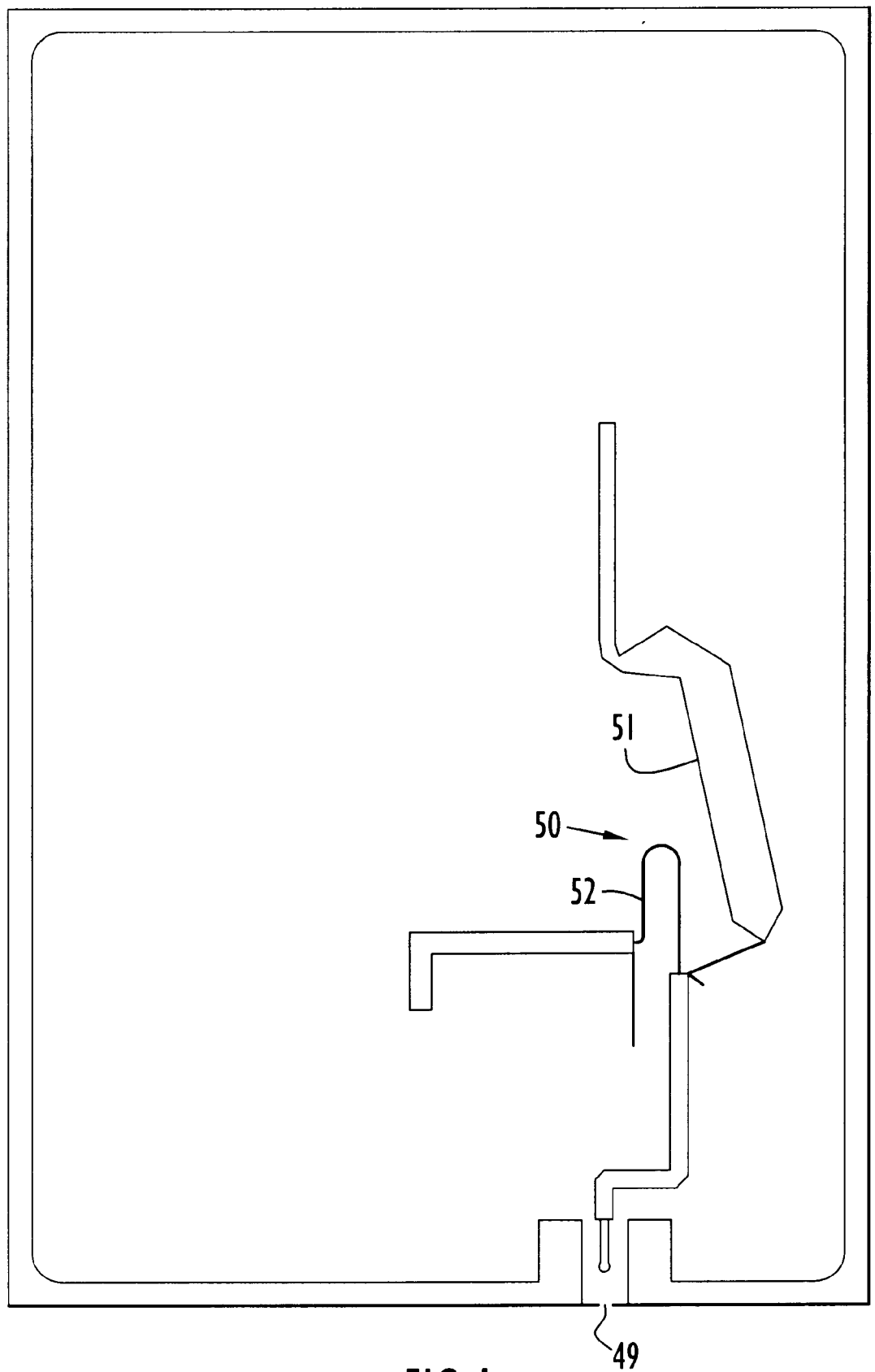
FIG. 4: a view of the underside of the printed circuit board of FIG. 1 on the reduced-scale view (about 70%)

FIG. 3 and 4 show a representation, true to the original, of the upper and lower sides of the printed circuit board 1 on a scale reduced to about 70% of the actual size.

The view in FIG. 4 (see also FIG. 2) shows that frequency diplexer circuit is etched by a strip transmission line technique on the underside of the printed circuit board 1, in order to combine both the above named HF ranges to a single connection 49 to a test device. Thus the diplexer 50 is formed from two impedance converters or transformers 51 and 52, which adapt the 50 Ohm impedance of the test appliance to the respective impedance of the antenna elements 7 or 8 for the associated frequency range. For the respectively other frequency range, the impedance converter has an infinitely high impedance, so that the arrangement illustrated operates as a diplexer.

Figure 5:
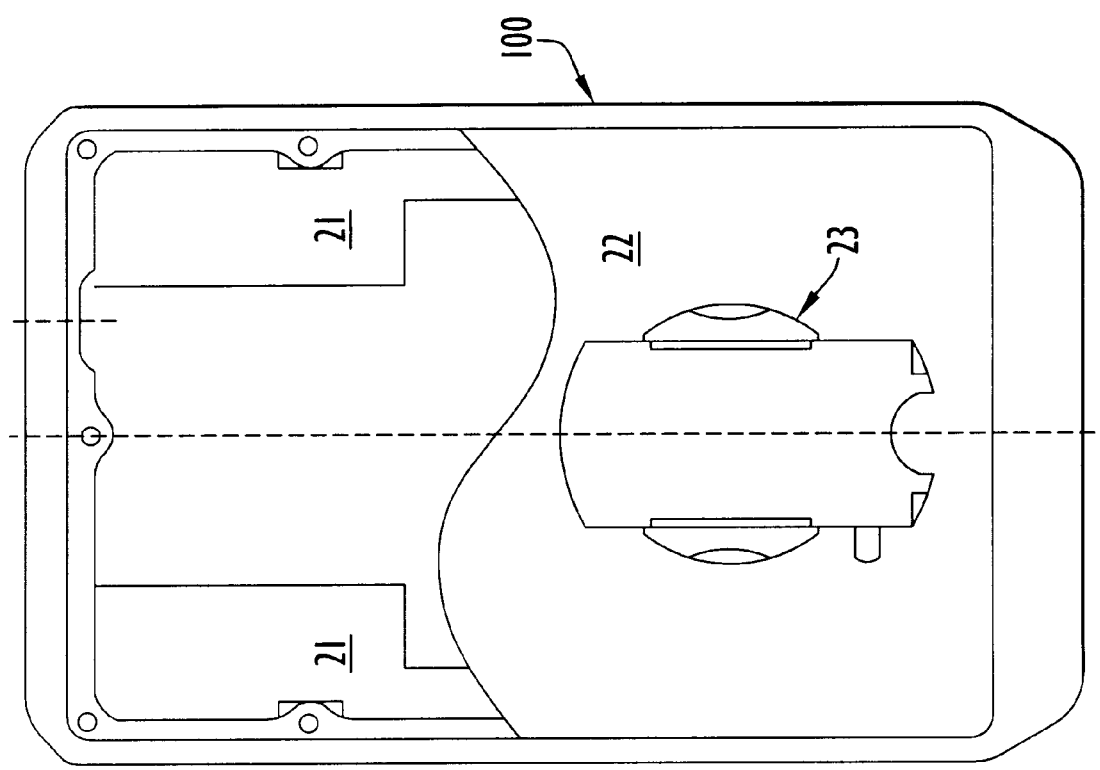
FIG. 5: a partly broken-away reduced-scale plan view of the antenna coupler according to the invention.

FIG. 5 shows a partly broken away, reduced-scale plan view of the antenna coupler according to the invention. It can be seen from the upper, broken away portion of FIG. 5 that the screened casing is lined with an HF attenuating material 21, in order to attenuate interfering reflections in the casing. Shown in the lower portion of FIG. 5 is a plan view of a cover plate 22, which is disposed above the printed circuit board 1 (not shown in FIG. 5). Secured on the cover plate 2 is a mobile universal holder 23, which accommodates the mobile telephone 10 to be tested.

Figure 6:
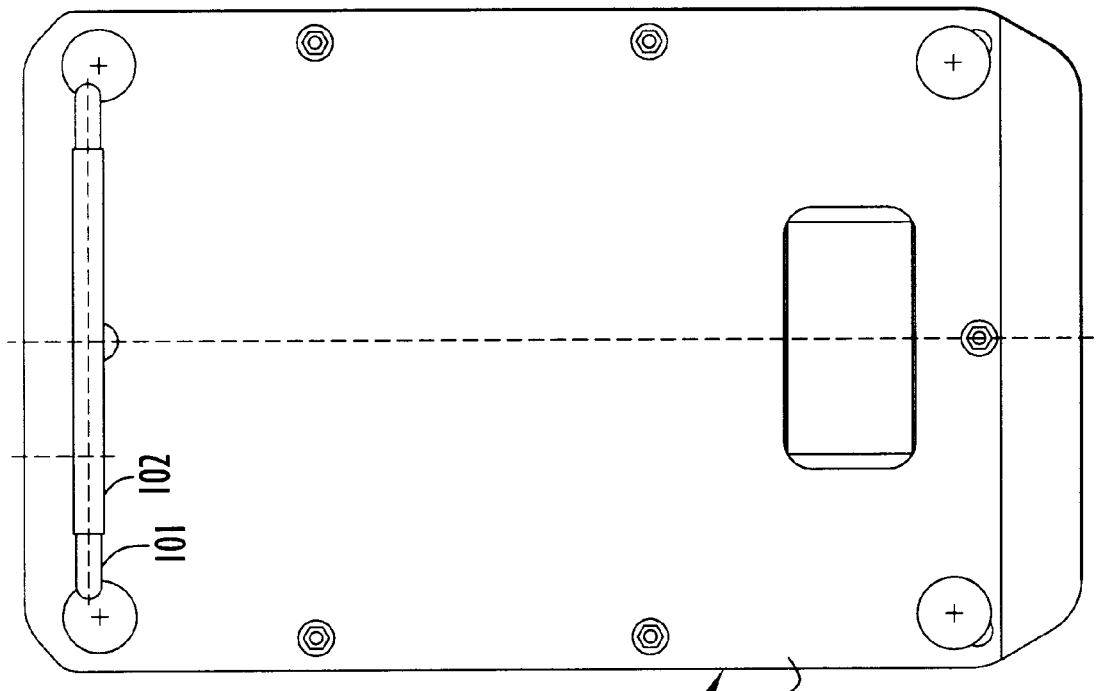
FIG. 6: a reduced-scale view from below of the antenna coupler according to the invention.

FIG. 6 shows a reduced-scale view from below of the antenna coupler 100 according to the invention. In order to mount the antenna coupler 100 in an ergonomically advantageous variably oblique position on a working surface, there is provided at one end of the casing 20 a U-shaped wire loop 101 extending over the transverse side, which is surrounded in its horizontal portion by a rubber hose 102. The facility of oblique positioning of the antenna coupler 100 and thus of the mobile telephone 10 located in the plastic holder 23 is therefore particularly advantageous, as the mobile telephone 2 is accessible, contrary to prior art, during operation of the antenna coupler 100, and therefore can be used.

Without further analysis, the foregoing will so fully disclose the gist of the present invention that others can readily adapt it for various applications with omitting features that, from the standpoint of prior art, fairly constitute essential characteristics of the generic or specific aspects of this invention and, therefore, such adaptions should and are intended to be comprehended within the meaning and range of equivalence of the following claims. In particular, the invention is not restricted to the embodiment shown with two antenna elements for two different frequency ranges. For a person skilled in the art it is self-evident, in view of the present disclosure, that the number of antenna elements and/or their design can be varied with respect to the type and the frequency range of the antenna elements, and their absolute and relative arrangement on the printed circuit board, can be varied depending on the requirements of the antenna coupler, without deviating from the spirit and scope of the present invention.

I claim:

1. Antenna coupler (100) for testing a mobile telephone (1), wherein said antenna coupler (100) comprises:

a printed circuit board (1), upon the upper side of which there is formed at least one antenna element (7,8); and an accommodating element for the mobile telephone (10), secured above said printed circuit board (1).

2. Antenna coupler (100) according to claim 1, wherein said antenna element (7,8) is a slot antenna (7) or a dipole antenna (8).

3. Antenna coupler (100) according to claim 2, wherein a supply line to the antenna element (7, 8) is formed on the underside of said printed circuit board (1).

4. Antenna coupler (100) according to claim 3, wherein said supply line has an impedance converter (51,52).

5. Antenna coupler (100) according to claim 1, wherein said printed circuit board (1) comprises a first and a second antenna element (7,8), said first antenna element (7) being provided for a first frequency range, and said second antenna element (8) for a second frequency range.

6. Antenna coupler (100) according to claim 5, wherein said first frequency range is 880–960 MHz and said second frequency range is 1710–1990 MHz.

7. Antenna coupler (100) according to claim 6, wherein said first antenna element (8) is a dipole antenna, and said second antenna element (7) is a slot antenna.

8. The antenna coupler (100) according to claim 5, wherein said first and second antenna elements (7, 8) are disposed substantially orthogonally to one another on the upper side of said printed circuit board (1).

9. The antenna coupler (100) according to claim 5, wherein said first antenna element (7) is disposed substantially orthogonally to an antenna (12) of said mobile telephone (10), and is disposed substantially centrally to a body (11) of said mobile telephone (10).

10. The antenna coupler (100) according to claim 5, wherein said second antenna element (8) is disposed substantially parallel and substantially underneath an antenna (12) of said mobile telephone (10), on the upper side of said printed circuit board (1).

11. The antenna coupler (100) according to claim 5, wherein both said antenna elements (7, 8) are combined via a diplexer (50) to a single connection (49) to a test device.

12. The antenna coupler (100) according to claim 11, wherein said diplexer (50) is formed on the underside of said printed circuit board (1).

13. The antenna coupler (100) according to claim 12, wherein said diplexer (50) has a first impedance converter (51), and a second impedance converter (52) for adapting the impedances of said first and second antenna elements (7, 8) to the impedance of the connection (49).

14. The antenna coupler (100) according to claim 13, wherein said first impedance converter (51) for the frequency range of said second antenna element (8) has an infinite impedance, and wherein said second impedance converter (52) for the frequency range of said first antenna element (7) has an infinite impedance.

15. The antenna coupler (100) according to claim 14, wherein said upper side of said printed circuit board (1) consists substantially of conductive material, which is grounded.

16. The antenna coupler (100) according to claim 14, wherein said underside of said printed circuit board (1) is surrounded by a screened housing (20).

17. The antenna coupler (100) according to claim 16, wherein said accommodating element for said mobile telephone (10) is a mobile universal holder (23) made of a non-metallic material.

18. Antenna coupler (100) for testing a mobile telephone (10), wherein said antenna coupler (100) comprises:

a printed circuit board (1), upon the upper side of which there is formed first and second antenna elements (7, 8), said first antenna element (7) being provided for a first frequency range, and said second antenna element (8) for a second frequency range, both said antenna elements (7, 8) being combined via a diplexer (50) to a single connection (49) to a test device, said diplexer (50) being formed on the underside of said printed circuit board (1) and having a first impedance converter (51), and a second impedance converter (52) for adapting the impedances of said first and second antenna elements (7, 8) to the impedance of the connection (49); and an accommodating element for the mobile telephone (10), secured above said printed circuit board (1).

19. Antenna coupler (100) for testing a mobile telephone (10), wherein said antenna coupler (100) comprises:

a printed circuit board (1), upon the upper side of which there is formed first and second antenna elements (7, 8), said first antenna element (7) being a dipole provided for a first frequency range of 880–960 MHZ, and said second antenna element (8) being a slot antenna for a second frequency range of 1710–1990 MHZ, both said antenna elements (7, 8) being combined via a diplexer (50) to a single connection (49) to a test device, said diplexer (50) being formed on the underside of said printed circuit board (1) and having a first impedance converter (51) and a second impedance converter (52) for adapting the impedances of said first and second antenna elements (7, 8) to the impedance of the connection (49), said first impedance converter (51) for the frequency range of said second antenna element (8) and said second impedance converter (52) for the frequency range of said first antenna element (7) both having an infinite impedance; and an accommodating element for the mobile telephone (10), secured above said printed circuit board (1).

* * * * *